Aug. 29, 1967     J. G. DROP     3,337,941
RECYCLE CONTROL CIRCUIT FOR A CHIP POSITIONING MACHINE
Filed May 27, 1965     11 Sheets-Sheet 1
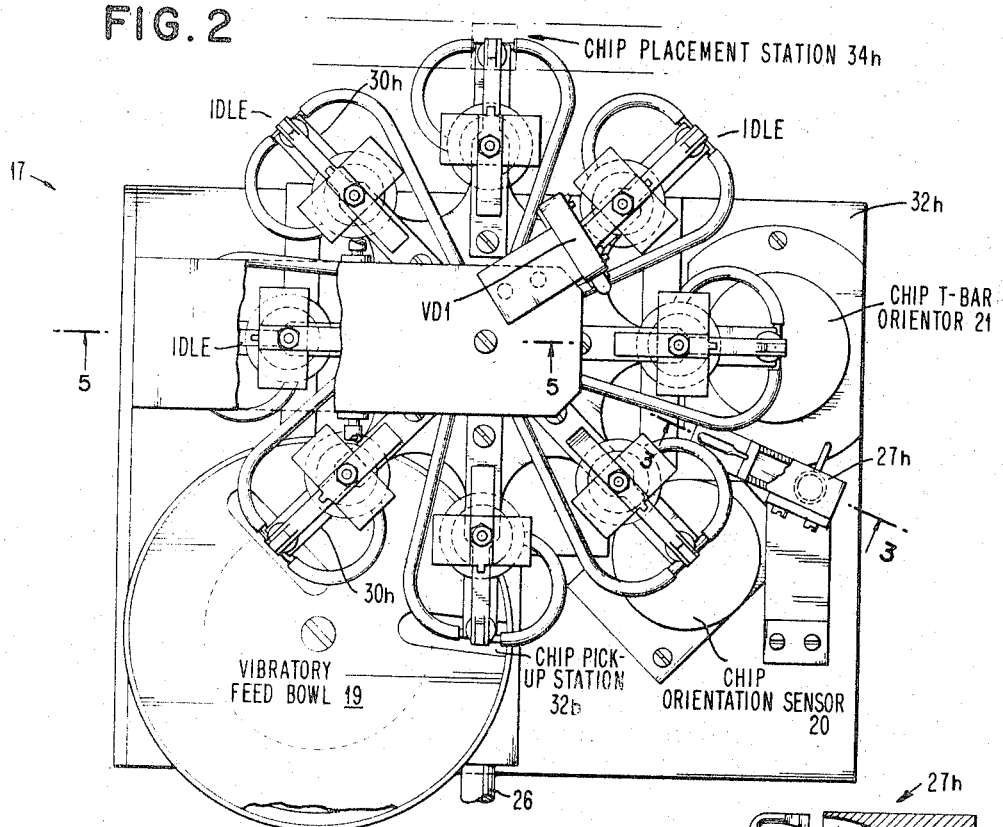
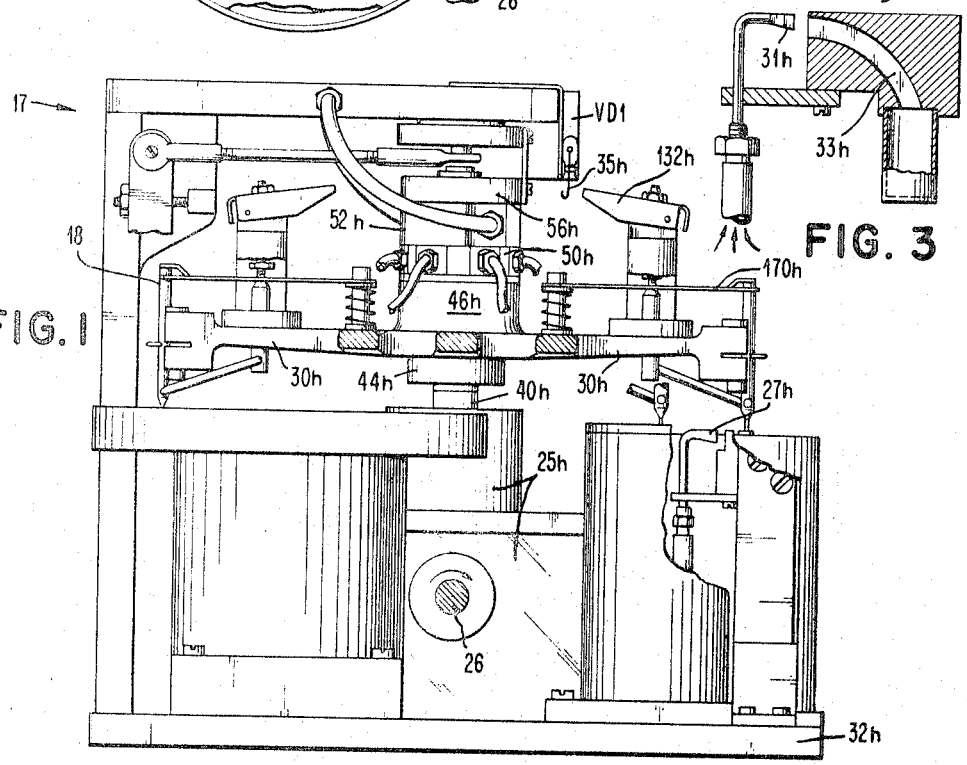

Aug. 29, 1967            J. G. DROP            3,337,941
RECYCLE CONTROL CIRCUIT FOR A CHIP POSITIONING MACHINE
Filed May 27, 1965            11 Sheets-Sheet 4
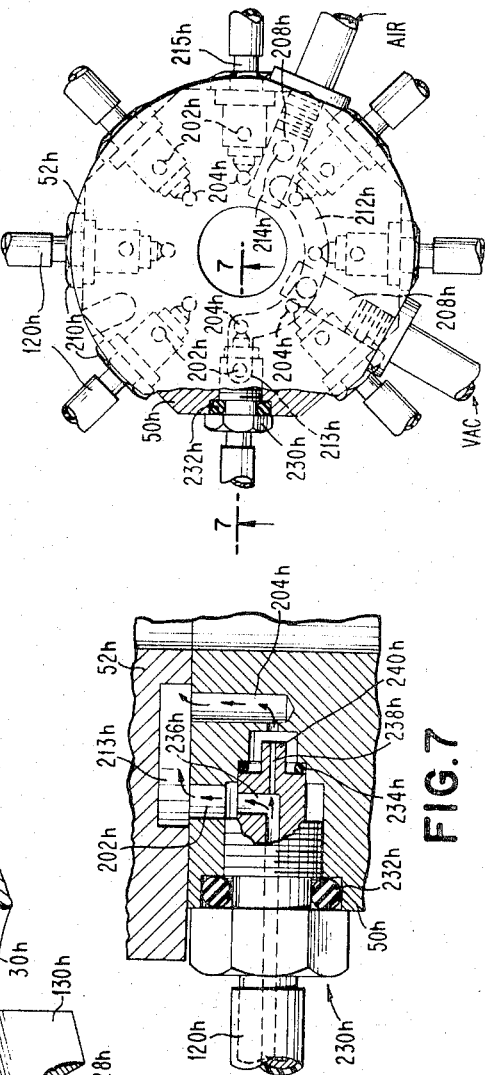
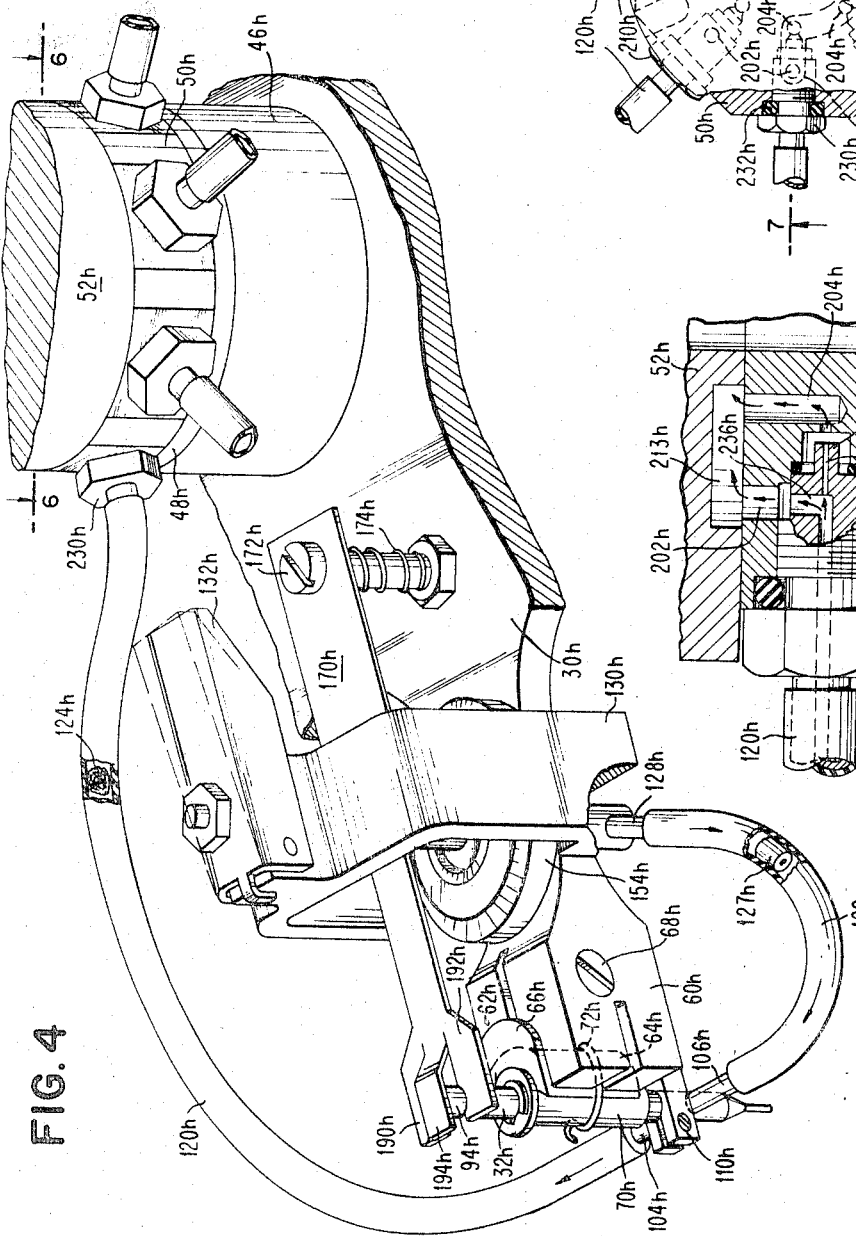

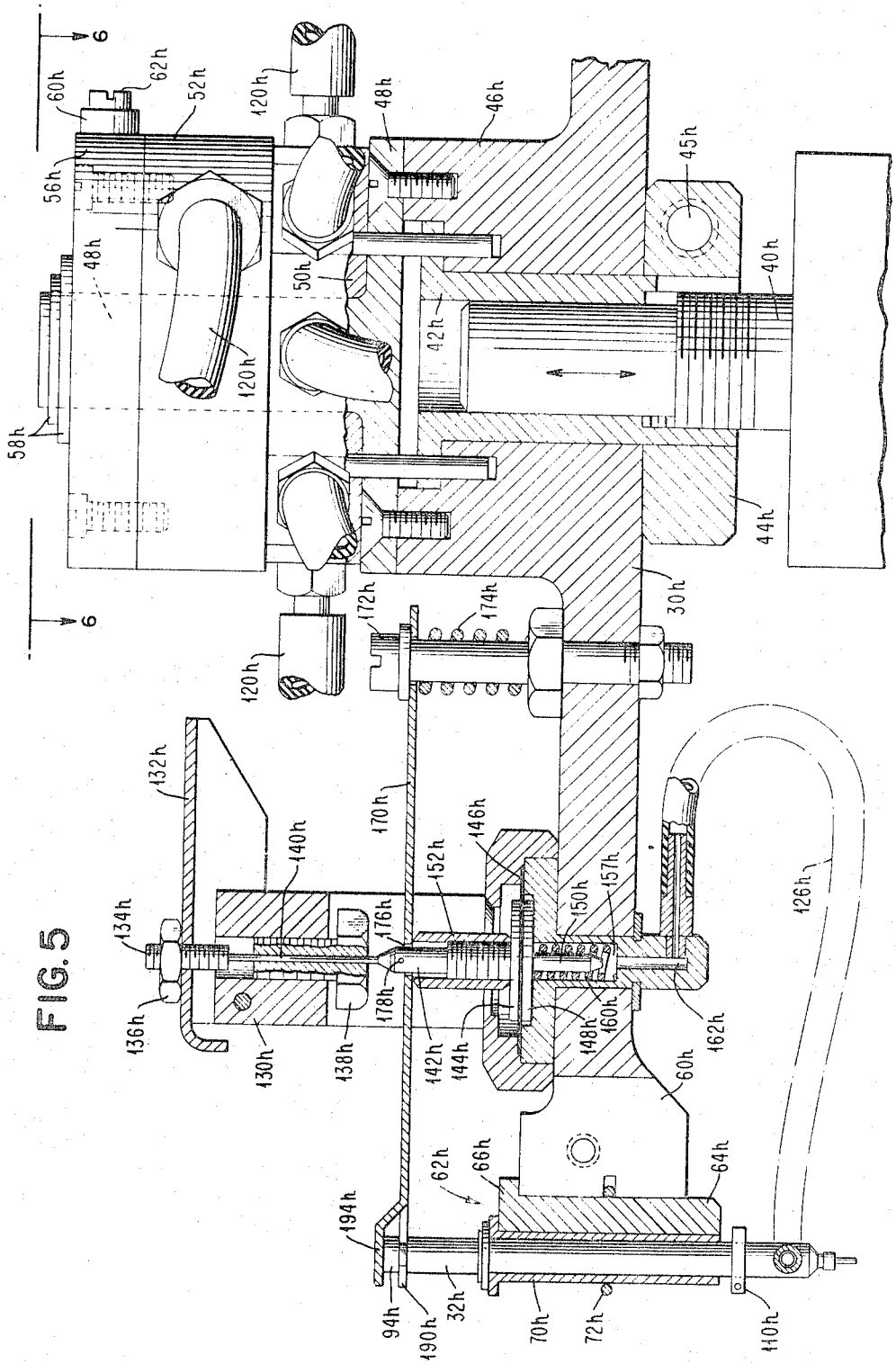

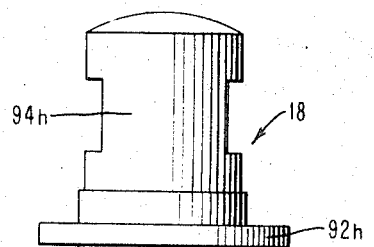
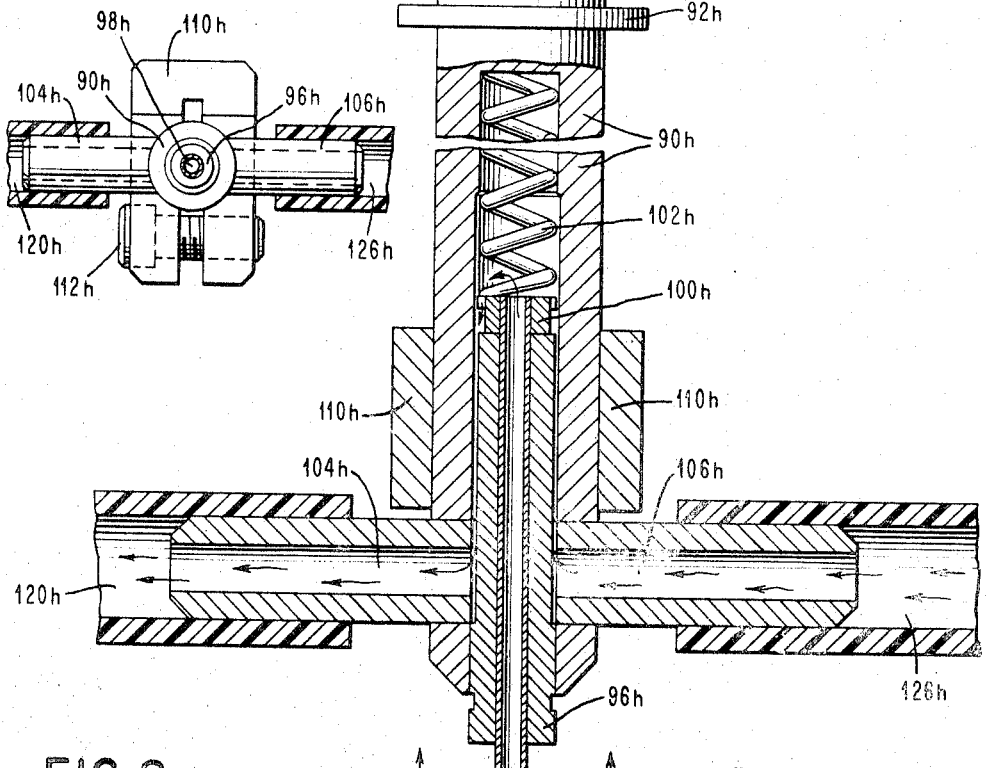
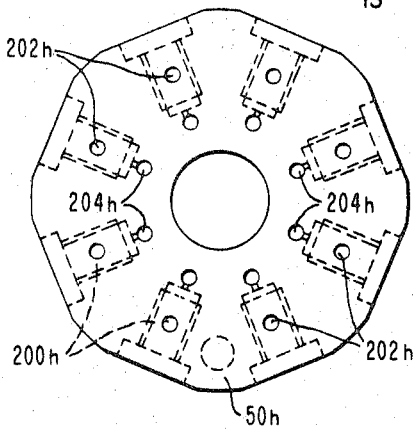
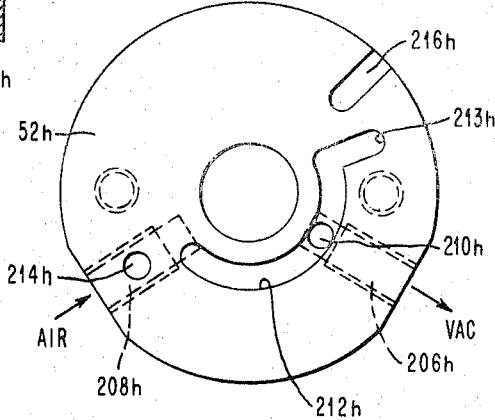

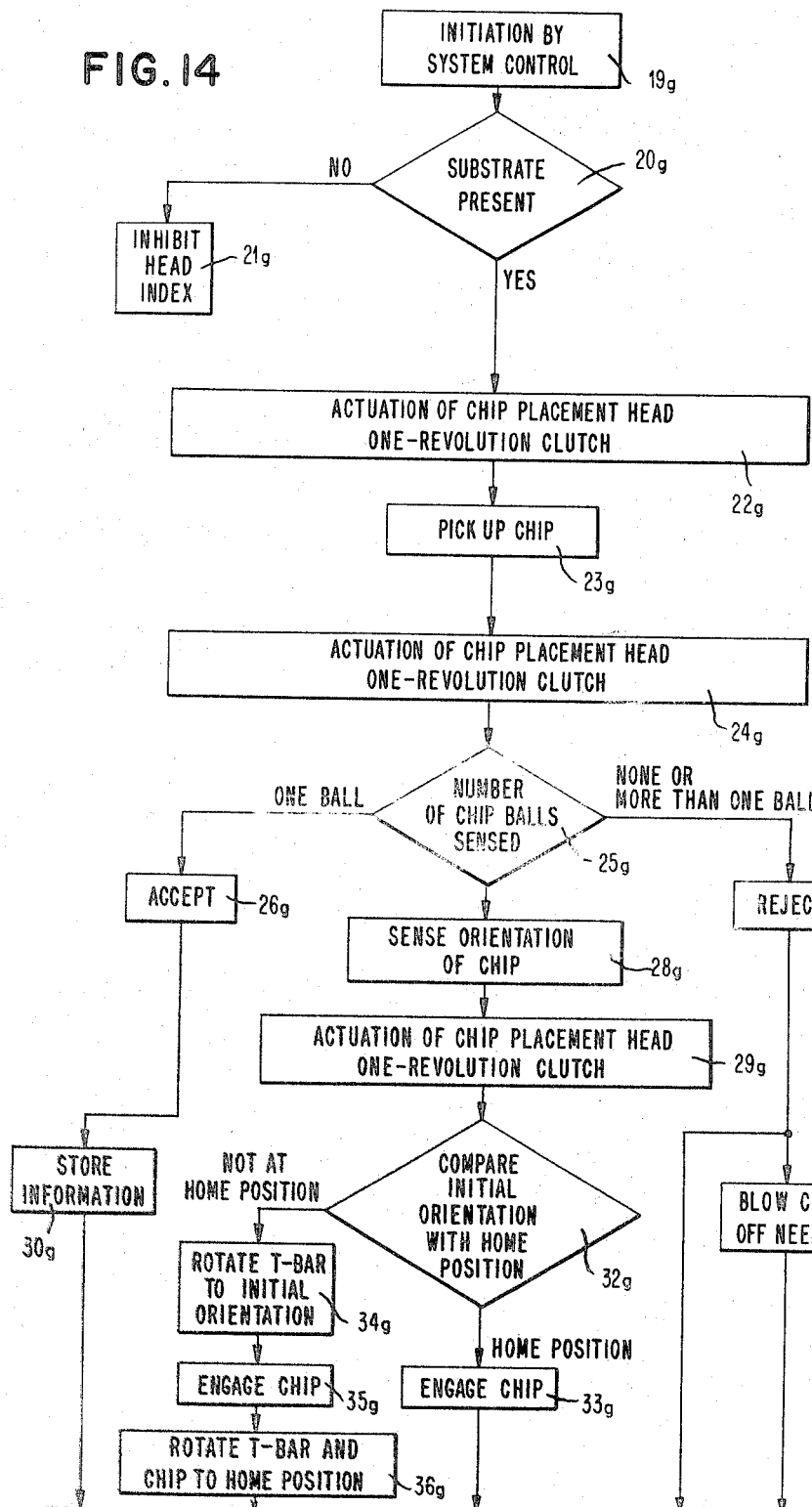

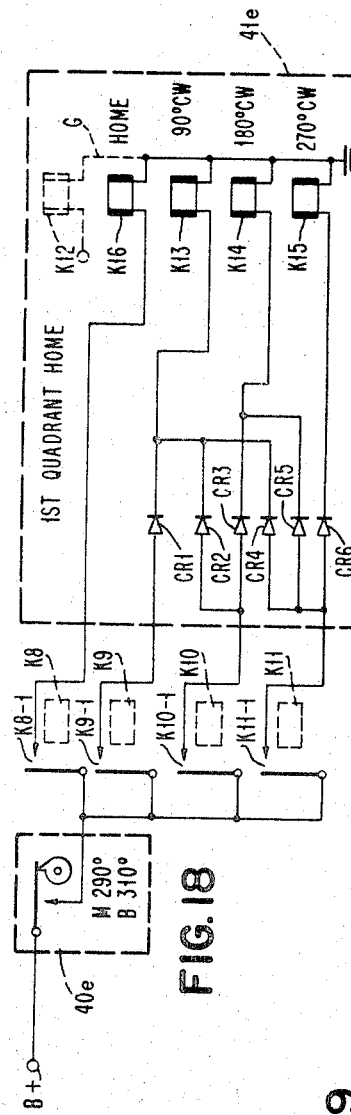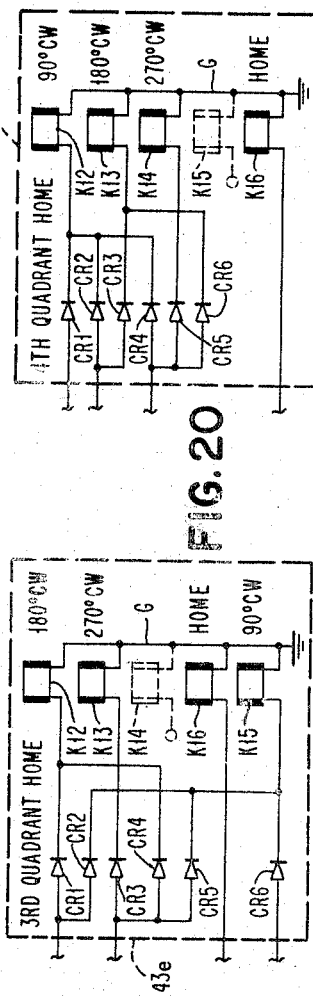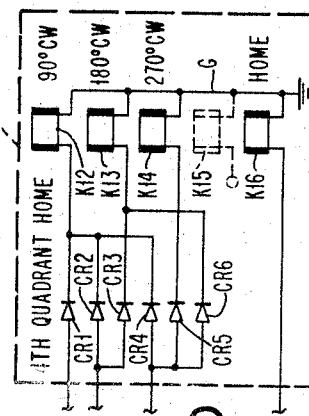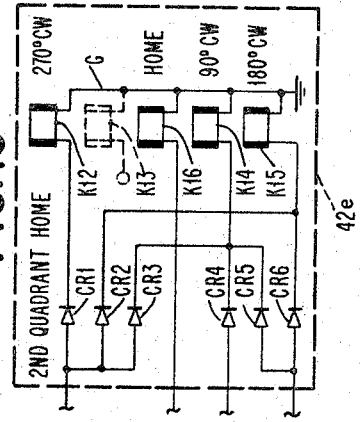

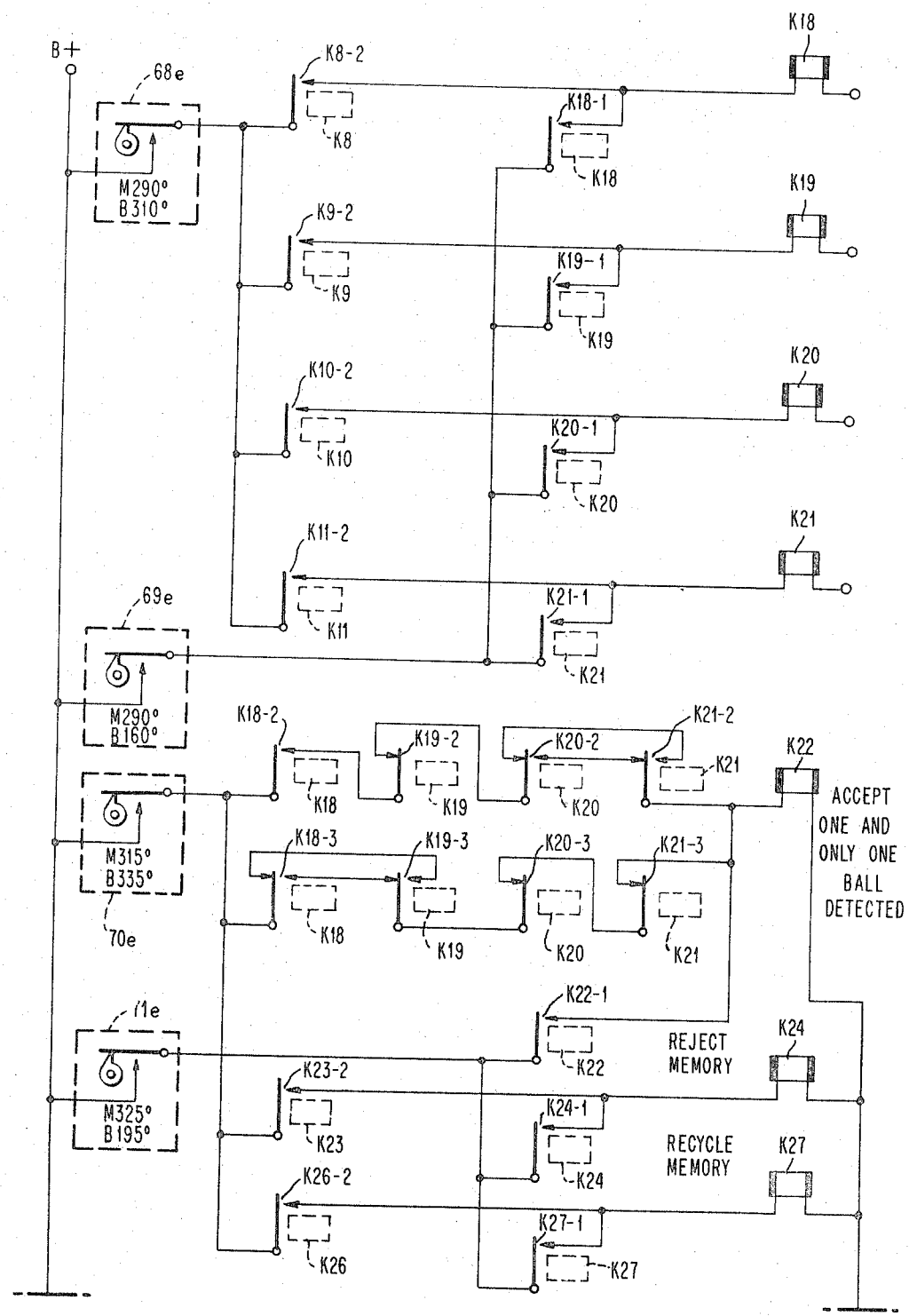

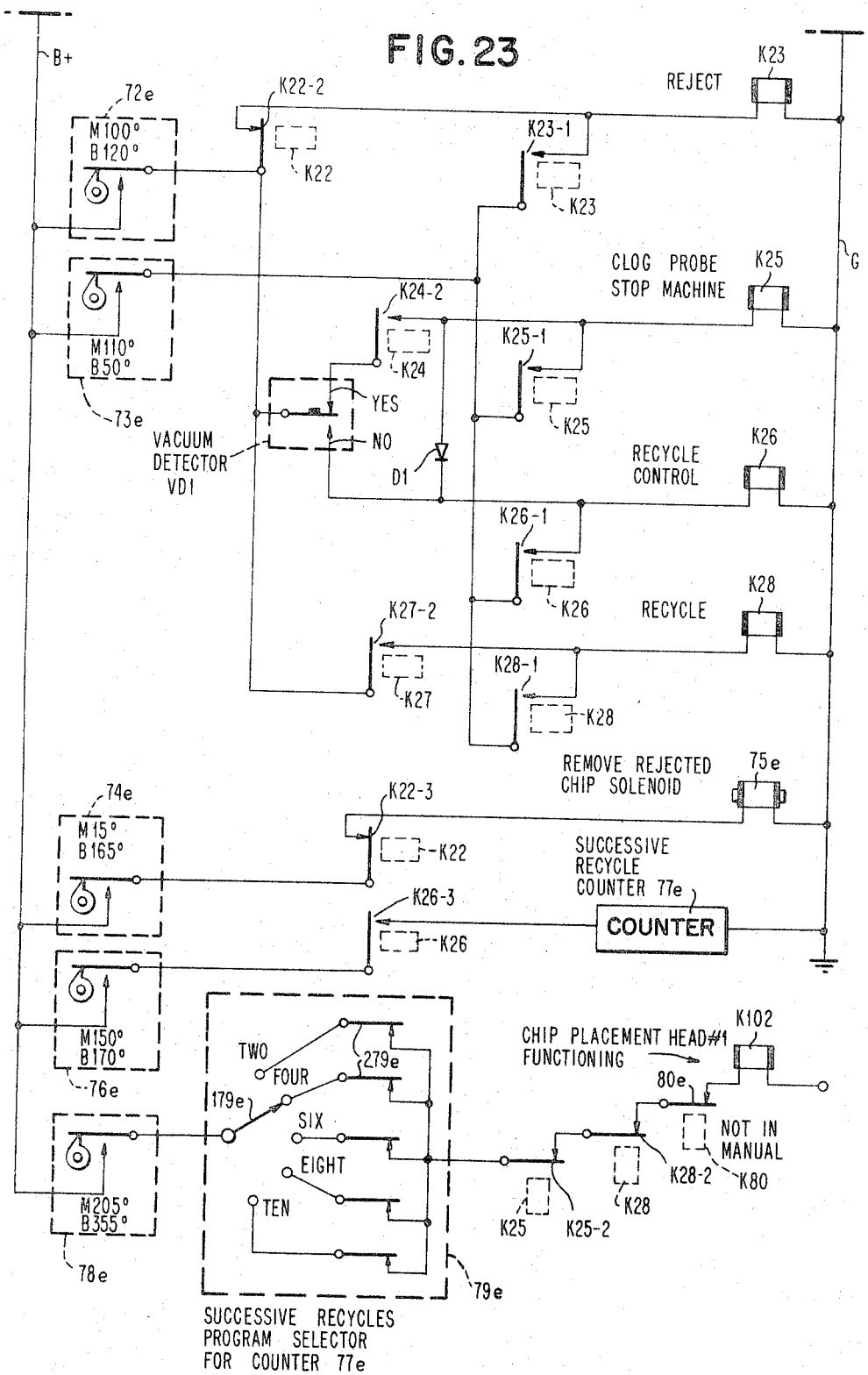

United States Patent Office 3,337,941
Patented Aug. 29, 1967

3,337,941
RECYCLE CONTROL CIRCUIT FOR A CHIP POSITIONING MACHINE
Joseph G. Drop, Poughkeepsie, N.Y., assignor to International Business Machines Corporation, Armonk, N.Y., a corporation of New York
Filed May 27, 1965, Ser. No. 459,342
9 Claims. (Cl. 29—203)

ABSTRACT OF THE DISCLOSURE

A chip positioning machine which automatically assembles semiconductor chips onto printed-circuit substrates is provided with a recycle control circuit whereby in the event that a particular vacuum needle fails to place a chip upon the substrate because the chip fell off or was blown off or some other cause, the tape conveyor does not index, the substrate is held in position, and the chip placement head recycles to bring the next needle into operation in another attempt to position a chip upon the same substrate. This head recycling operation will continue repeatedly while the conveyor remains stationary until either a chip is finally placed upon the substrate so that thereafter the operation continues normally or a predetermined number of successive chip placement head recycles occur whereafter the machine is stopped for adjustment or repair.

---

This invention relates to a recycle control circuit for a chip positioning machine which automatically assembles semiconductor chips onto printed-circuit substrates.

With the advent of hybrid transistor circuit technology, there arose more stringent requirements of precision, speed and uniformity than had theretofore been achieved in the art of automated circuit manufacture. This hybrid technique involves first the screen printing of the resistors and conductive lands on an alumina substrate. The transistors or diodes in the form of semiconductor chips are then positioned onto the conductive lands. Because the chips are almost microscopic in size, each measuring 0.028 inch square, and are joined to the lands by contact elements in the form of copper balls which are only 0.005 inch in diameter, they cannot be handled by conventional automated assembly techniques. The problem is further complicated by the need for extreme accuracy and precision in positioning the chips on the relatively small and closely-spaced conductive lands which are only 0.005 to 0.015 inch wide and 0.005 inch apart, as well as by the extreme delicacy of the structure involved.

Furthemore, the vast number of circuit substrates required in the manufacture of each digital computer, which is at present the primary use for this hybrid circuit technology, demands that the chip positioning operation be performed at relatively high speeds and with a high yield in order to maintain the high volume required in production. The large number of circuit substrates utilized in a single computer also demands uniformity in manufacture in order to increase the reliability of the final assembled apparatus.

In copending application Ser. No. 459,179, filed May 27, 1965, concurrently herewith and entitled, "Chip Positioning Machine" there is disclosed a novel machine for automatically positioning transistor and diode chips onto the conductive lands of printed-circuit substrates with precision, uniformity at a high production rate, and without damage to the structure of either the chips or the substrates.

To accomplish this object, the substrates with the resistors and conductive lands already screen printed thereon are first automatically loaded onto a metal endless conveyor tape which carries the substrates sequentially through a number of work stations. The tape is indexed periodically after each working cycle to move the next succeeding substrate to each of the stations. At the first station, the areas of the conductive lands which are to receive the contact balls of the semiconductor chips are suitably prepared. The tape then conveys the substrate to the first of a series of chip positioning stations.

At each of said positioning stations the semiconductor chips are first aligned upright with their contact balls lowermost and are randomly angularly oriented with the collector ball in either of the four quadrants. Each chip is then picked up on the end of a vacuum needle with the chip in this initial angular orientation. Since it is necessary to align the angular orientation of the chip so that the contact balls coincide with the configuration of the land pattern upon which the chip is to be placed, the original random orientation of the chip on the needle is first sensed. Then the chip is rotated through the angular displacement necessary for proper orientation to coincide with that of the substrate land pattern. The vacuum needle is then lowered to position the chip at a precise location on the pattern. The substrate is then carried by the conveyor tape to the succeeding chip positioning stations in sequence where additional chips are positioned onto various other respective portions of the substrate conductive land pattern.

If the chip orientation sensing device is engaged by either no balls or more than one ball due to a defect or misalignment of the chip, the latter is automatically blown off the vacuum needle by a jet of air, and is prevented from moving downwardly to dip the exposed lower end of the needle into the flux in the event that there is no chip on said end of the needle. This prevents the flux from entering the open lower end of the needle to clog the latter.

The present invention relates to a novel control arrangement whereby in the event that a particular needle fails to place a chip upon the substrate because the chip fell off or was brown off or some other cause, the tape conveyor does not index, the substrate is held in position, and the chip placement head recycles to bring the next needle into operation in another attempt to position a chip upon the same substrate. This head recycling operation will continue repeatedly while the conveyor remains stationary until either a chip is finally placed upon the substrate so that thereafter the operation continues normally or a predetermined number of successive chip placement head recycles occur whereafter the machine is stopped for adjustment or repair.

Although for purposes of illustration the semiconductor chips are disclosed as being of the type wherein each chip constitutes a single diode or transistor, it will be understood that the subject invention may also be utilized to position chips of the type wherein each constitutes a monolithic integrated circuit comprising a plurality of diodes and/or transistors as well as other circuit components together with conductive lands interconnecting same. Furthermore, the subject invention may find utility in other assembly operations where it is desired to position one or more smaller work-pieces at precise locations upon a larger workpiece.

The foregoing and other objects, features and advantages of the invention will be more apparent from the following more particular description of a preferred embodiment of the invention, as illustrated in the accompanying drawings wherein:

FIG. 1 is a side elevation of the chip placement head;
FIG. 2 is a plan view of the chip placement head in combination with each of the specific stations associated therewith;

FIG. 3 is a partial sectional view of the chip blow-off mechanism;

FIG. 4 is an isometric view of a representative arm of the chip placement head showing details of the vacuum pin arrangement;

FIG. 5 is a section view of a representative arm of the chip placement head taken along line 5—5 in FIG. 2;

FIG. 6 is a view taken along line 6—6 in FIGS. 4 and 5 to show the superimposed positions of the vacuum distributor and vacuum manifold;

FIG. 7 is a sectional view showing a representative vacuum nozzle and portion of the vacuum manifold taken along line 7—7;

FIG. 8 is a plan view of the vacuum distributor with the vacuum manifold removed;

FIG. 9 is a view of the bottom portion of the vacuum manifold which normally mates with the upper portion of the vacuum distributor;

FIG. 12 is a complete section of a vacuum probe;

FIG. 13 is a view of a vacuum probe taken along line 13—13;

Figure 11:
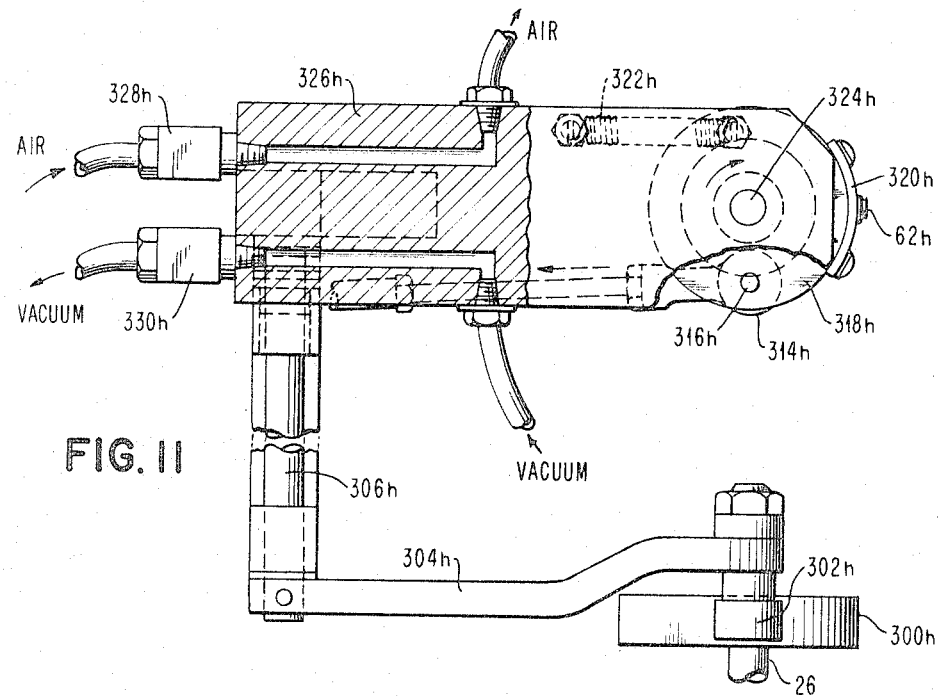
FIG. 11 is a plan view of the mechanism of FIG. 10.

FIGS. 14 through 23 inclusive are electrical circuit diagrams showing the electrical control system for the subject machine.

*Chip placement head*

Referring now to FIGS. 1 and 2, chip placement head 17 includes eight stations, four of which are idle and four of which perform specific functions in regard to feeding, orienting and placing the transistor chips in their proper position upon a substrate. The major moving part of chip placement head 17 is spider 30h which is provided with eight radial arms, each of which supports a vacuum needle 18. Each vacuum needle 18 is adapted to pick up a transistor chip, transport it between stations, and place it in its proper position upon a prefluxed substrate. The spider is actuated by an index mechanism to be described hereinbelow. Prior to each arm of the spider reaching a station, the entire mechanism is in an elevated position to allow the needle to clear obstructions between stations. Upon arriving at the stations, the spider is lowered by the indexing mechanism and lower the vacuum needles into the respective stations. At the termination of the stations' operations, the indexing mechanism raises the spider and rotates the spider arm to succeeding stations.

Before proceeding to a more detailed description of chip placement head 17, the following summary of operations performed at each of the stations will aid in understanding the operation of the system. The ultimate purpose of chip placement head 17 is to provide a transistor chip at placement station 34h (FIG. 2) with its copper ball contacts oriented in such a manner as to exactly mate with the dimple pattern on the substrate land configuration, and deposit the chip in place upon the substrate at the correct time. To accomplish this function, vibratory feed bowl 19 performs the function of providing chips to a chip pick-up station 32b in a queued-up ball-contact down configuration. While the ultimate desire is to place each semiconductor chip on a substrate, this cannot be done unless the chip's ball-contacts are arranged to precisely mate with the substrate dimpled land pattern. Vibratory feedbowl 19 is incapable of assuring this required preset orientation. Accordingly, a vacuum needle 18 picks up a chip at pick-up station 32b and carries it to chip orientation sensor 20. Upon receiving a semiconductor chip, chip orientation sensor 20 performs two functions. First, a pair of guide jaws within the sensor 20 precisely locate the chip with respect to the tip of vacuum needle 18. In addition, when vacuum needle 18 inserts a chip in the ball-contacts down orientation into chip orientation sensor 20, an oddly placed ball-contact acts to deflect a lever arm thereby providing an indication of the chips orientation. A signal is produced indicating the sensed orientation and is transmitted to chip T-bar orientor 21. The T-bar orientor responds to the signal by pre-rotating to a position where its T-bar head will mate with the ball contact pattern. The aforementioned guide jaws are opened and the chip is readied for the next index step. When vacuum needle 18 and its associated chip are next indexed to T-bar orientator station 21, the vacuum needle places the chip upon a rotatable T-bar which as aforestated has been pre-rotated to fit within the interior of the chip's contact pattern. The T-bar orientor 21 then rotates the chip on the end of vacuum needle 18 to the correct orientation for placement. In addition to correcting the angular orientation of the chip, the mating of the T-bar with the contact pattern of the chip provides a final precise orientation of the chip and assures that its contacts will exactly mate with the substrate dimple pattern. Vacuum needle 18 and its associated chip is then indexed through an idle station to chip placement station 34h where it is placed upon a prefluxed substrate borne by a conveyor tape (not shown).

In addition to the above-described stations, chip placement head 17 is provided with blow-off mechanism 27h and a recycle switch VD1. Blow-off mechanism 27h is positioned intermediate chip orientation sensor 20 and chip T-bar orientor 21. Blow-off mechanism 27h is shown in section in FIG. 3 and comprises an airblast head 31h and an operatively disposed channel 33h which leads to a receptacle. Blow-off station 27h is so positioned that during the indexing of a vacuum needle from chip orientation sensor 20 to chip T-bar orientor 21, the needle tip and its associated semiconductor chip pass directly between airblast head 31h and channel 33h. If for any reason chip orientation sensor 20 provides an output which is indicative of a malformed chip a chip held on end, a chip with insufficient ball-contacts, etc., it energizes a logic circuit which causes a blast of air to be applied to head 31h. This airblast is sufficient to dislodge a chip from the tip of a vacuum needle and cause it to enter channel 33h to the receptacle.

Recycle switch VD1 (FIG. 1) is basically a microswitch with a downwardly extending switch actuating lever 35h. Its operation in combination with other portions of chip placement head 17 will be described in greater detail hereinafter.

The main drive for chip placement head 17 comes from shaft 26 which feeds directly into head indexing mechanism 25h. This mechanism is described in greater detail hereinafter, but for the time being it will suffice to say that the mechanism provides an indexing drive motion via shaft 40h to spider 30h. It also provides a required vertical displacement of shaft 40h and spider 30h during the time when vacuum needles 18 are being indexed between stations (to prevent damage to the needle tips). As shown in FIG. 5, shaft 40h has a threaded portion which threads into interior threads in bushing 42h. Clamp 44h prevents rotary movement between shaft 40h and bushing 42h once the desired orientation between them has been established. Clamp 44h is tightened by virtue of a bolt which extends through hole 45h. Bushing 42h is shrunk to fit into spider collar 46h to prevent any relative movement therebetween. A centering plate and shaft 48h are rigidly affixed to spider collar 46h via a plurality of set screws. Vacuum distributor 50h fits down over the centering shaft 48h and provides the means for distributing both vacuum and positive air pressure to the respective arms of spider 30h. Directly over and mating with distributor 50h is a vacuum manifold 52h which provides the function of supplying and switching vacuum and positive air pressure between various ones of the outputs of distributor 50h. Distributor 50h is rigidly affixed to and rotates with spider collar 46h by virtue of pins 54h which extend through centering plate 48h, bushing 42h and into collar 46h. A manifold top plate 56h fits directly over manifold 52h and is affixed thereto by set screws. Retaining plates 58h fit down over shaft 48h and rigidly force manifold 52h to bear against distributor 52h and provide an airtight seal therebetween. A bushing 60h is rigidly attached to the side of manifold top plate 56h by set screw 62h. The relative position of vacuum manifold 52h with respect to vacuum distributor 50h can be varied by causing a force to be applied to bushing 60h thereby causing a rotation of manifold top plate 56h and manifold 52h about centering plate shaft 48h. The specific operation of this apparatus will be described in detail hereinafter.

Since each arm of spider 30h is structurally identical, only one need be explained. An isometric view of one arm is shown in FIG. 4 and the same arm in section is shown in FIG. 5. Spider arm 30h has an enlarged and slotted end portion 60h with a vertical hole drilled therethrough which is adapted to accommodate a vacuum needle holding fixture 62h. Fixture 62h comprises a round portion of bar stock 64h which has been slotted to accommodate vacuum needle 18. A cap 66h is attached to bar stock portion 64h. The center line of bar stock portion 64h falls to the right of the end of enlarged portion 60h of spider arm 30h. If it is thus desired to adjust the exact location of vacuum needle 32h, cap 66h may be grasped and rotated with a resultant lateral movement of vacuum needle 18 occurring due to the offset between the center line of bar member 64h and the enlarged end 60h. When set screw 68h is tightened, it draws the slotted portions of enlarged member 60h together, thereby gripping vacuum holding fixture 62h and preventing any further lateral movement thereof. Vacuum needle 18 is slidably mounted in necked cylinder 70h which is in turn held to vacuum probe holding fixture 62h by spring clip 72h.

The structure of a vacuum needle 18 is shown in FIG. 12. Outer housing 90h is a hollow tube with one closed-off end. At the upper extremity of housing 90h, a downward limiting stop 92h and slotted nut 94h are attached. Interior to housing 90h is a fixed bushing 96h which has slidably mounted therein hollow probe pin 98h. Attached to one end of probe pin 98h is an extended diameter collar 100h. A compression spring 102h bears down upon extended collar 100h and acts to maintain probe pin 98h in a downwardly extended position. Extending through housing 90h are a pair of tubes 104h and 106h. It should be noted that bushing 96h is attached to the inner surface of housing 90h only below the entry point of tubes 104h and 106h. Above their attachment point, there is a clearance space between housing 90h and the outer circumference of bushing 96h. Thus, if a vacuum is applied to tube 104h, not only will air be drawn up through probe pin 98h and down through the clearance area between bushing 96h and probe body 90h, but also, air will be drawn into tube 106h, around bushing 96h and into tube 104h. Thus, if a vacuum is applied to tube 104h and there is a semiconductor chip held at the end of probe pin 98h, all of the air drawn through vacuum needle 18 must come via tube 106h. If on the other hand, there is no chip held by probe pin 98h, a significant portion of the air drawn into tube 104h will be drawn through probe pin 98h thereby considerably reducing the vacuum applied via tube 106h. As will become hereafter apparent, this fact is utilized to control the recycle actuating mechanism.

An adjustable stop 110h surrounds housing 90h and provides a lower limiting stop for the travel of vacuum needle 18. FIG. 13 better shows the details of stop 110h. By causing nut 112h to be loosened, stop 110h may be moved either up or down on housing 90h. Vibratory feed bowl 19 has a stop (not shown) associated therewith. When vacuum probe 32h is lowered into feed bowl 19, stop 110h is adjusted to impact with said feed bowl stop to prevent the tip of probe pin 98h from touching the surface of a semiconductor chip and thereby being damaged.

Returning now to FIG. 4, a hose 120h connects tube 104h to a vacuum outlet nozzle 230h from vacuum distributor 50h. A filtering agent 124h is shown in a cutaway portion of hole 120h and prevents debris from being drawn up into the vacuum mechanism. An additional hose 126h connects tube 106h to the recycle lever actuation mechanism via vacuum port 128h. A constrictor 127h is inserted into hose 127h for a purpose to be hereinafter discussed.

The purpose of the recycle lever actuation mechanism is twofold. It is basically a pneumatic logic element which reacts to the absence of a semiconductor chip at the tip of a vacuum needle by (1) raising the vacuum needle and (2) raising the switch actuating lever so that it may engage the recycle switch. The recycle lever actuation mechanism is supported by a vertically disposed housing 130h which is rigidly affixed to spider arm 30h. Pivotally mounted on the upper extended portion of vertical housing 130h is recycle actuation lever 132h. As can be more clearly seen in FIG. 5, a screw is threaded through recycle actuation lever 132h and is held in place by nut 136h. A hollow hex-head screw 138h is threaded into the extended portion of vertical housing 130h and forms the guide for a slidably mounted push pin 140h. Push pin 140h rests at its lower extremity upon impeller 142h. The lower portion of impeller 142h is threaded and extends through washer 144h, and diaphragm 146h to a diaphragm hold plate 148h. A guide pin 150h is attached to and points downwardly from diaphragm hold plate 148h. A bushing 152h is threaded onto the threaded portion of impeller 142h and holds washer 144h, diaphragm 146h and diaphragm hold plate 148h in a sandwich-like configuration. The outer circumference of diaphragm 146h is clamped between members 154h and 156h. Member 156h has an orifice 157h which houses compression spring 160h. A communicating orifice 162h connects to vacuum port 128h and hose 126h.

A leaf spring 170h is restrained at one end by a nut and shaft arrangement 172h. Compression spring 174h allows leaf spring 170h to pivot in the plane of the paper while maintaining it in its indicated position. A clearance hold 176h in leaf spring 170h mates with impeller 142h and locking pin 178h holds leaf spring 170h against bushing 152h. At its far extremity, (see FIG. 4) leaf spring 170h is arranged to lock with slotted nut 94h via its separarted arms 190h and 192h. Arm 194h bears upon the upper portion of slotted nut 94h.

In brief, the actuation of recycle lever 132h causes it to be tilted upwardly so that its end engages the downwardly extending arm 35h of recycle switch VD1 (FIG. 1). This indicates to the machine that no semiconductor ship is held by the tip of the associated vacuum needle and that when the placement operation occurs with this respective vacuum needle, that the conveyor tape must be held in place until the next vacuum needle is indexed into the chip placement station 34h. If this does not occur, the substrate which arrives at the chip placement station at the same time with the particular needle without a chip arrives, the substrate will obviously have no chip placed thereon and will be defective. At the same time lever 132h is raised, leaf spring 170h also raises vacuum needle 18 and prevents it from being immersed in the prefluxed surface of the substrate at chip placement station 34h. This action thereby prevents the needle from being clogged and carrying the flux to other portions of the chip placement head. It is vitally important in the operation of this machinery that no flux enter any portions thereof.

In the detailed description of the operation of recycle lever actuation mechanism which follows, FIGS. 4 and 5 will be primarily referred to. When spider arm 30h arrives at chip pickup station 32b it is lowered into place over the station through the action of the spider's movement. Stop 110h engages stop 40b in vibratory bowl 19 and causes leaf spring 170h to be flexed upwardly thereby preventing any vacuum needle bounce. At this time, no vacuum is applied via tube 120h to vacuum needle 18. In the recycle lever actuating mechanism, compression spring 160h pushes diaphragm 146h upwardly until washer 144h engages the bottom of member 154h. Impeller 142h is thus also moved upwardly and push pin 140h bearing against threaded screw 134h causes recycle lever 132h to be tilted upwardly (as shown in phantom in FIG. 4).

When vacuum needle 18 is placed over chip pickup station 36h, a vacuum is applied via hose 120h to the needle. The air which is thus caused to be drawn up through probe pin 98h (FIG. 12) picks up a semiconductor chip and causes the tip of probe pin 98h to be sealed. The vacuum applied via hose 120h must thereby be satisfied by the air flow through hose 126h. The increased vacuum in hose 126h is reflected into orifice 157h in the recycle lever actuation mechanism via port 128h and orifice 162h. The increased vacuum opposes the action of compression spring 160h and thereby brings diaphragm 146h down to the unstressed position shown in FIG. 5. Note that diaphragm 146h completely seals the vacuum system from the atmosphere and so long as a significant vacuum is applied via hose 126h diaphragm 146h will remain in its indicated position. When diaphragm 146h is drawn downwardly by the applied vacuum, the impeller 142h and push pin 140h are also drawn down with the result being that recycle actuation lever 132h is lowered to the horizontal position.

Immediately after a chip is picked up by vacuum needle 18 the amount of vacuum applied to tube 120h is somewhat lowered by vacuum manifold 52h (in a manner to be described hereinafter), but so long as a chip remains on the tip of probe pin 98h, the vacuum reflected through hose 126h is sufficient to overcome spring 160h and maintain diaphragm 146h in its unstressed position.

Should it occur that no semiconductor chip is picked up at chip pickup station 136h or, that during the indexing operation of the chip placement head, the chip is dislodged from the tip of probe pin 98h (e.g. by chip blow-off mechanism 27h), the following action occurs. The aforementioned reduced vacuum which was applied immediately after vacuum probe 32h left chip pickup station 36h is of sufficient quantity to maintain diaphragm 146h in its unstressed position only so long as the tip of probe pin 98h is sealed. If for any reason a semiconductor chip is dislodged therefrom, the resulting reduction in vacuum through hose 126h allows compression spring 160h to expand and raise diaphragm 146h to a point where washer 144h bears against the bottom of member 154h. This action, through the aforedescribed mechanism, causes leaf spring 170h to raise thereby raising vacuum needle 18 and also raises recycle lever 132h to its tilted position. Thus, when this particular vacuum needle leaves the chip T-bar orientor 21, the tilted portion of recycle lever 132h engages arm 35h of recycle switch VD1 (FIG. 1). The actuation of recycle switch VD1 inhibits the indexing of the conveyor tape for one cycle and allows a substrate on the tape to await the arrival of the following vacuum needle. The action of leaf spring 170h in raising vacuum probe 32h prevents the tip of probe pin 98h from being dipped into the flux on the surface of the position substrate, thereby preventing it from being clogged.

With reference now to FIGS. 6 to 9, vacuum manifold 52h and distributor 50h will be described. In FIG. 6, vacuum manifold 52h is shown in place over vacuum distributor 50h. The center shaft of centering plate 48h extends up through and aligns vacuum distributor 50h and vacuum manifold 52h with each other. To better visualize the structure of vacuum distributor 50h, refer to FIG. 8 where it alone is shown. A plurality of threaded fittings 200h are provided therein and adapted to accept vacuum nozzles (to be hereinafter described). Each threaded fitting is provided with two holes 202h and 204h both of which communicate with the upper surface of vacuum distributor 50h. Turning now to FIG. 9, a vacuum manifold 52h has been flipped over to show its underside which normally mates with the upper side of vacuum distributor 50h. Vacuum manifold 52h is provided with two inlet fittings, fitting 206h being utilized to provide vacuum and fitting 208h being utilized to provide pressurized air. Vacuum fitting 206h is provided with a hole 210h which communicates with a semicircular indented channel 212h. At one extremity, indented channel 212h is provided with a perpendicular leg 213h. Air inlet 208h is also provided with a hole 214h which communicates with the surface of vacuum manifold 52h. An atmospheric inlet 216h is also formed into the surface of vacuum manifold 52h.

Referring now back to FIG. 6, the relative positions of the air and vacuum inlets 206h and 208h respectively are shown as is also the location of channels 212h with respect to holes 204h. Note that hole 202h only has vacuum applied to it when it is coincidently positioned with perpendicular vacuum channel 213h. Note also that hole 214h in an inlet 208h is coincident with hole 202h in vacuum fitting 215h when both the air inlet and fitting are aligned.

Referring to FIG. 7, a sectional view of a representative vacuum nozzle 230h in place in a vacuum fitting in vacuum distributor 50h is shown. When nozzle 230h is inserted into the vacuum fitting and tightened down, it compresses O rings 232h and 234h to provide airtight seals. Hole 236h provides communication between the interior hollow section of nozzle 230h and hole 202h in vacuum distributor 50h. An additional small diameter hole 238h is drilled in aligning pin 240h and opens the interior of nozzle 230h to hole 204h in vacuum distributor 50h. With vacuum manifold 52h in place as shown, perpendicular channel 213h communicates with both holes 202h and 204h. Thus, if a vacuum is applied via vacuum inlet 208h, air may be drawn through both holes 236h and 238h and 202h and 204h respectively, to create a substantial vacuum at the outlet of vacuum nozzle 230h. If now, vacuum manifold 52h is rotated with respect to vacuum distributor 50h allowing only hole 204h to communicate with vacuum channel 212h, a "metered" vacuum is applied via hole 238h to vacuum nozzle 230h. This is the same reduced vacuum referred to hereinbefore which is applied to a vacuum needle immediately after it leaves pickup station 32b.

Figure 10:
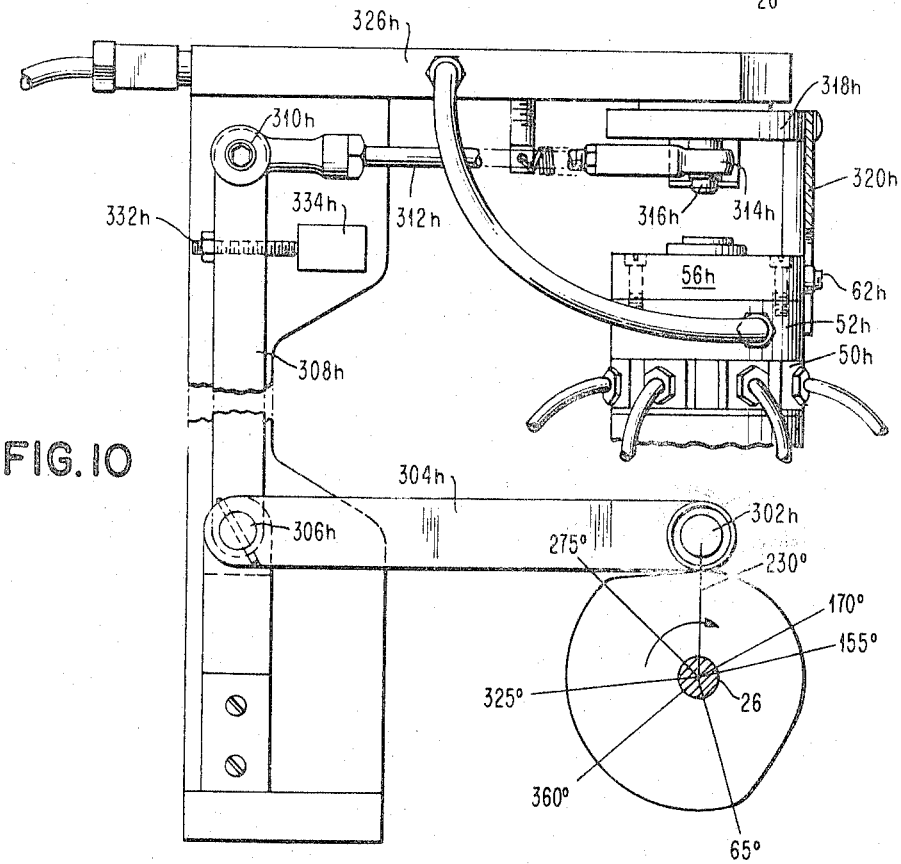
FIG. 10 is a side elevation of the cam and drive mechanism which causes relative movement between the vacuum distributor and vacuum manifold.

Referring now to FIGS. 10 and 11, the means for providing controlled relative movement between vacuum manifold 52h and vacuum distributor 50h will be described. Cam 300h is mounted on shaft 26 and makes a single revolution for each index of chip placement head 17. Cam 300h is provided with a high dwell which extends between 275 degrees–65 degrees and a low dwell which extends from 155 degrees–230 degrees. From 230 degrees to 275 degrees is a relative "steep" rise to the high dwell, whereas from 65 degrees–155 degrees is a relatively gradual slope to the low dwell. Follower 302h is coupled to arm 304h which is in turn rigidly affixed to shaft 306h. Also rigidly affixed to shaft 306h is vertical arm 308h which terminates in ball joint 310h (not shown in FIG. 11). A threaded screw 332h is mounted on 308h and engages fixed stop 334h to provide a forward limit to the movement of arms 308h. Emanating from ball joint 310h in a generally horizontal direction is manifold actuating arm 312h. The other extremity of arm 312h terminates in a bearing 314h which is rotatably mounted via pin 316h to disc 318h. Extending downwardly from, and rigidly affixed to disc 318h, is camming bar 320h which engages the bearing surface of nut 62h. Also attached to disc 318h is a preloading spring 322h. Disc 318h is mounted to rotate about shaft 324h which in anchored in a portion of frame 326h. Also forming a portion of frame 326h (FIG. 11) are pressurized air inlets 328h and vacuum inlet 330h.

As cam 300h rotates, follower 302h rises up on the high dwell and causes arms 304h to rotate in a counter clockwise direction. This rotation imparts a like rotation to arm 308h which draws manifold actuating arms 312h to the left. This in turn causes a clockwise rotation of disc 318h which is transmitted to manifold top plate 56h via camming bar 320h and nut 62h. This action causes a relative clockwise rotation to occur between manifold 52h and distributor 50h and results in a movement of the relative positions of the vacuum channel and communicating holes respectively contained therein.

Referring now to FIG. 14, there is shown the initial portion of the logic flow diagram corresponding to the control circuit of one of the chip placement heads 17, it being understood that each of the several heads 17 have an identical circuit so that only one will be described. The logic initiated by a pulse from the system control as indicated at 19g (25e). A logic decision is first made at 20g (26e, 27e, K-7) as to whether a substrate S is present on the conveyor tape 1. A negative determination designated by the line marked "NO" inhibits indexing of the chip placement head 17 as indicated at 21g so that chips C will be placed upon the empty conveyor tape.

If a substrate S is present at that operative station as designated by the line marked "YES" this results in actuation of the chip placement head one-revolution clutch 31 at 22g (29e, 30e, K7-2). Describing the sequence of operations of one of the vacuum needles 18 on the head 17, actuation of the one-revolution clutch 31 causes this needle 18 to pick up a chip C from the vibratory bowl feeder 19 as symbolized by the operation at 23g. The one-revolution clutch 31 for the placement head 17 is then actuated at 24g (29e, K7-2, 30e) to carry the needle 18 with the chip C thereon to the chip orientation sensor 20 where a logic decision is made at 25g (35e) as to the number of chip balls sensed. If only the collector ball is sensed as designated by the line marked "ONE BALL" this is characterized as an "ACCEPT" condition as shown at 26g (70e, K18-2, 19-2 to 21-2 K22, 18-3 to 21-3). If none of the chip balls or more than one chip ball is sensed this is deemed a "REJECT" condition as at 27g (72e, K22-2, K23). The chip ball sensor 20 also determines the initial orientation of the chip C on the needle 18 as shown at 28g (34e, 36e to 39e, K8 to K11).

The chip placement head 17 is then again indexed by actuation of its one-revolution clutch 31 at 29g (29e, K7-2, 30e). A logic decision is made at 32g (40e, 41e, K8-1 to K11-1) with respect to the initial orientation of the chip sensed at 28g. This initial orientation is compared with the selected "home" position. If the initial orientation of the chip C is such that it is already at the "home" position, the chip is merely engaged but not rotated by the T-bar chip orientor 21 at 33g. If the initial orientation is not at the "home position" the T-bar is rotated at 34g (K6-2, 46e to 49e, K17-1 to K17-4, 50e to 56e) to an orientation corresponding to that of the chip C. The T-bar then engages the chip C at 35g and the T-bar together with the chip engaged thereby are rotated at 36g (K6-2, 60e to 63e, K12-2e to K15-2e, 51e to 56e) to selected home position.

In the event that the number of chip balls sensed at 25g was either none or more than one ball so as to result in a "REJECT" condition at 27g, the chip is blown off the vacuum needle 18 at 31g (74e, K22-3, 75e).

Figure 16:
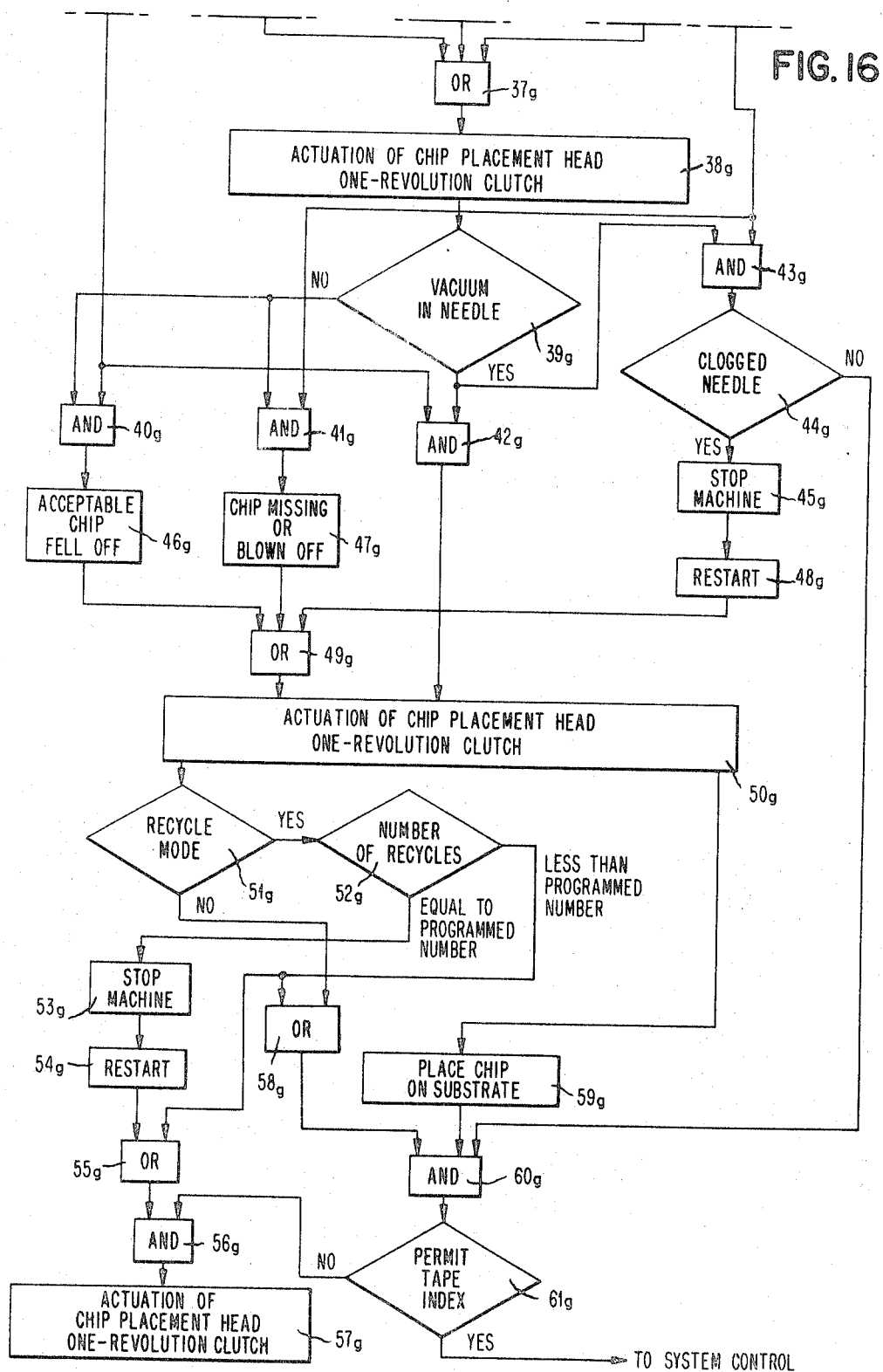

Referring now to FIG. 16, the "OR" function at 37g is satisfied by either the "ENGAGE CHIP" operation at 33g (FIG. 14) or the "ROTATE T-BAR AND CHIP TO HOME POSITION" operation at 36g, so as to cause actuation of the chip placement head one-revolution clutch 31 at 38g (FIG. 16) (29e, K7-2, 30e) and thereby index chip placement head 17 to move the vacuum needle 18 with the oriented chip C thereon. During this indexing movement, a logic decision is made at 39g (VDI) as to whether there is vacuum in the needle 18. A negative determination designated by the line marked "No" is fed to both of the "AND" operations at 40g and 41g. The "AND" function at 40g also requires a signal from the "STORE INFORMATION" operation at 30g (FIG. 14). The "AND" operation 41g must also be satisfied by a signal from the chip blow-off operation at 31g (FIG. 14). Said signal is also fed to an "AND" operation at 43g.

An affirmative decision that there is vacuum in the needle 18 and designated by the line marked "Yes" is sent to the "AND" operation at 43g and also to an "AND" operation at 43g and also to an "AND" operation at 42g which must also be satisfied by the "STORE INFORMATION" signal from 30g in FIG. 14.

Fulfillment of both input conditions of the "AND" function at 40g indicates that the chip C was originally acceptable but that there is now no vacuum in the needle 18 thereby indicating that the lower open end of the needle is exposed to the atmosphere and that therefore the acceptable chip must have fallen off the needle 18. This conclusion is shown at 46g (72e, VDI, K26).

Fulfillment of both of the input conditions of the "AND" function at 41g indicates that at the time of chip ball sensing at 15g either there was no chip C on the vacuum needle 18 or that the chip was defective and was subsequently blown off at 31g in FIG. 14. This conclusion is shown at 47g (72e, VDI, K26) in FIG. 16.

Fulfillment of both of the input conditions at the "AND" operation 42g indicates that the chip C was originally sensed at 25g as acceptable and is still on the lower end of the vacuum needle 18 by virtue of the affirmative decision at 39g.

If the chip was blown off at 31g in FIG. 14 but, nevertheless, there is an affirmative indication at 39g that there is still vacuum in the needle 18, then both of the input conditions to the "AND" function at 43g are fulfilled thereby indicting that there is flux or other foreign matter clogging and closing off the lower open end of the vacuum needle 18 so as to maintain a vacuum therein in the absence of a chip C mounted thereon. The logic decision at 44g (72e, VDI, K24-2, K25) as to whether there is a clogged needle then becomes affirmative as designated by the line marked "Yes" to stop the machine at 45g (K25). If either of these input conditions to the "AND" function at 43g is not fulfilled, then the decision at 44g is negative as designated by the line marked "No." If the machine is stopped at 45g due to a clogged needle determination at 44g, it may be manually restarted again at 48g after the clogged needles are serviced or replaced.

The "OR" function at 49g transmits a signal to actuate the chip placement head one-revolution clutch 31 at 50g (29e, K7-2, 30e) in response to either of the chip conditions at 46g or 47g or the restart condition at 48g. The chip placement head 17 will also be actuated at 50g in response to a signal from the "AND" operation at 42g to the effect that the chip was both accepted at 26g in FIG. 14 and is still on the needle 18 to maintain a vacuum therein as indicated at 39g in FIG. 16.

A manual switch (not shown) may be provided to set the control circuitry for operation in a recycle mode which is the normal preferred operative procedure. In this event, the logic decision at 51g will be affirmative as designated by the "YES" line leading to another logic decision at 52g (76e, K26-3, 77e) which compares the number of recycles of the chip placement head 17 to the programmed number of recycles. That is, the programmed number is manually selected and when the number of head recycles reaches this number the machine is stopped at 53g. If the number of recycles is less than the programmed number, a signal is transmitted to the "OR" operation at 58g which also receives a signal in the event that the recycle mode decision at 51g is negative.

In the event that the machine is stopped at 53g, after it is serviced to remove the cause or defect which produced the excessive number of recycles, it may be manually restarted as at 54g thereby transmitting a signal to the "OR" operation at 55g which also receives a signal in the event that the number of recycles is determined at 52g to be less than the programmed number. Either one of these inputs of the "OR" operation at 55g transmits a signal to the "AND" operation at 56g.

The previous actuation of chip placement head one-revolution clutch 31 at 50g results in the operation of placing a chip C upon the substrate S as symbolized at 59g. This transmits a signal to the "AND" operation at 60g which also has inputs from the "OR" operation at 58g and the negative determination of the "CLOGGED NEEDLE" decision at 44g. In the event that all three of these input conditions are met, there will be an affirmative determination at the logic decision 61g which determines that the tape 1 may index, thereby sending a signal to the system control through the line designated "YES."

In the event that one or more of the input conditions to the "AND" operation at 60g is not met, the decision at 61g (78e, 77e, K25-2, K28-2, 80e) will be negative to transmit a signal through the line designated "NO" to the "AND" operation at 56g. Satisfaction of both input conditions of the latter transmits a pulse thereby causing actuation of the chip placement head one-revolution clutch 31 at 57g. This results in recycling of the chip placement head 17 while the conveyor tape 1 remains stationary so as to permit the next vacuum needle 18 on the head 17 to attempt to place a chip C upon the same substrate S upon which the previous needle 18 had failed to place a chip.

Figure 17:
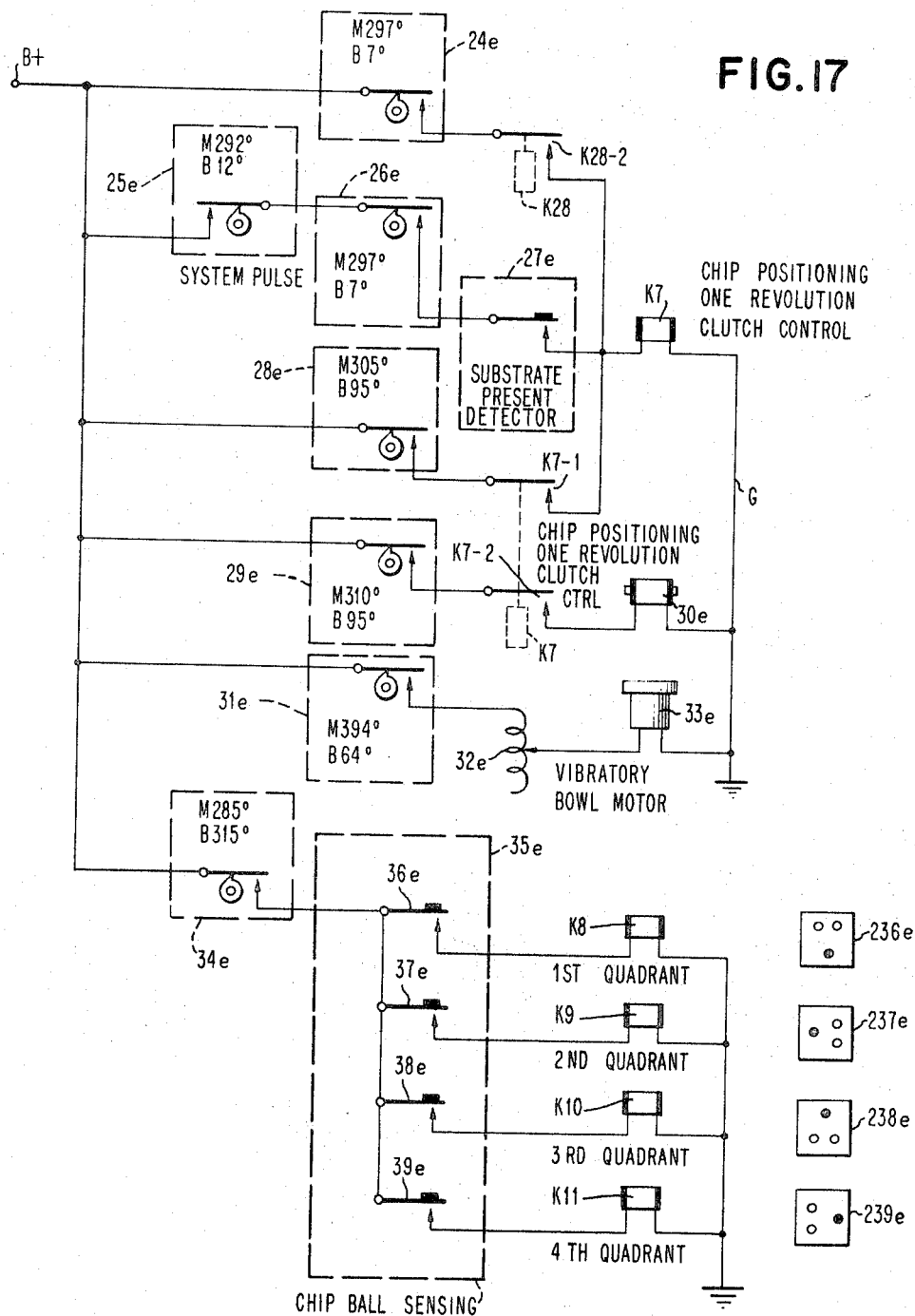

Referring now to FIG. 17, there is shown the initial portion of one of the plural identical circuits each controlling a respective one of chip placement heads 17. Since all of these circuits are identical, only one will be shown and described. Pulse timing switches 25e and 26e are in series so that the output of switch 26 will be the logical "AND" function of both switches. In series with the output of switch 26e is a substrate presence detector switch 27e. Each switch 27e of said plural identical circuits is physically located one tape index position before its respective chip positioning head 17. If a substrate S is present so as to close detector switch 27e, the concurrent transmission of pulses by system pulse timing switch 25e and pulse timing switch 26e will energize chip positioning control relay K7 so as to close contacts K7-1 to maintain relay K7 energized through pulse timing switch 28e and also to close contacts K7-2 to permit pulse timing switch 29e to energize the chip positioning one-revolution clutch control solenoid 30e. The latter in turn actuates chip positioning head 17 through one cycle of operation.

Vibratory feeder bowl 19 must not vibrate during the time interval when vacuum needle 18 is picking up a chip C from the pick-up point of the bowl. The solenoid motor 33e which vibrates bowl 19 is energized during the proper portion of the cycle by pulse timing switch 31e through the feed control 32e.

The printed circuit pattern on substrate S is designed so that the collector pad P, that is, that portion of the conductive land L which receives the collector ball B of chip C, may be oriented in a direction toward either of the four lateral edges of substrate S. Therefore, before chip C is positioned by vacuum needle 18 onto the pads P of substrate S, chip C must first be angularly oriented so that its balls B correspond to the orientation of the pads P at that particular location on substrate S to which chip C is to be assembled. Chip C is first oriented by vibratory feeder bowl 19 to any random one of four possible angular orientations which are designated as the first, second, third and fourth quadrants, depending upon the direction in which the collector ball is located. Each of these quadrants is indicated schematically at 236e, 237e, 238e and 239e wherein the collector ball is designated by the solid circular area and the base and emitter balls are shown as non-solid circles.

Since the initial orientation of chip C on the end of vacuum needle 18 is randomly in any one of these four posible angular orientations, it is first necessary to sense each chip to detect which of these four possibilities has materialized. The T-bar 2t of the chip orientor 21 is then rotated to the same orientation as chip C and the T-bar 2t then engages balls B of chip C. The T-bar 2t together with chip C is then rotated to the selected "home" position thereby finally orienting chip C to the desired orientation so as to properly align balls B with the respective land pads P upon which balls B will rest when chip C is positioned upon substrate S.

In order to determine the initial orientation of chip C when it is first picked up from the pick-up location of vibratory bowl feeder 19 by vacuum needle 18, there is provided a chip ball sensing device indicated generally by the reference numeral 35e and comprising a plurality of switches 36e, 37e, 38e 39e, each adapted to be closed when its respective feeler arm is actuated by contact with a collector ball B of the chip C being sensed. Each of these switch feeler arms will be engaged by a collector ball B when the latter is in a respective one of the four quadrants. That is, the feeler arm of switch 36e will be engaged by a collector ball in the first quadrant, that of switch 37e by a collector ball in the second quadrant, that of 38e by a collector ball in the third quadrant, and that of switch 39e by a collector ball in the fourth quadrant.

The switches 36e, 37e 38e 39e have one terminal connected to a common junction in turn connected to a pulse timing switch 34e and the other terminal connected to a respective one of the relays K8, K9, K10, K11 thereby energizing one of the latter when its corresponding switch is closed by virtue of the collector ball making contact with that switch feeler arm in that particular quadrant.

In order that the printed circuit pattern may be designed so that the collector pad P is oriented in any selected one of the four directions the control circuitry is arranged so that any one of the four quadrants may be selected as the "home" position in which the collector ball B will lie after chip C has been finally oriented and is ready for positioning upon the pads P of substrate S. In order to select which of the four quadrants will be "home" position for each chip placement head 17, the circuit components are switched by conventional means to provide any selected one of the four network configurations shown in FIGS. 18 to 21 inclusive. FIG. 18 shows the first quadrant as the "home" position, FIG. 19 the second quadrant, FIG. 20 the third quadrant, and in FIG. 21 the fourth quadrant is the "home" position.

For the purposes of illustration, let it be assumed that the circuit is programmed so that the first quadrant is selected as the "home" position and that when chip C is initially picked up on the end of vacuum needle 18 from vibratory bowl feeder 19 it is oriented so that its collector ball B is in the second quadrant as shown schematically at 237e. Therefore, when the chip orientation is sensed, the feeler arm of switch 37e will be engaged by the collector ball B to close switch 37e and thereby permit a pulse from pulse timing switch 34e to be transmitted to relay K9 thereby energizing the latter.

If at the time of chip ball sensing the chip C is properly held on the end of vacuum needle 18 so that its collector ball B is oriented in one of the four proper angular positions, and if chip C has the correct number of balls B at the proper locations thereon, then only one ball B will be contacted by the feeler arm of one of the switches 36e to 39e inclusive. However, if chip C is defective or is misaligned on vacuum needle 18 in a skewed position or is angularly displaced from one of the four quadrant orientations, then either none or more than one of switches 36e to 39e may be actuated during the chip ball sensing operation. In order to determine if only one ball is detected by one of the switches 36e to 39e there are provided in FIG. 22 a pulse timing switch 68e and a series of relays K18, K19, K20, K21 to be energized thereby through normally-open contact relays K8–2, K9–2, K10–2, K11–2 respectively. Relays K18 to K21 inclusive are maintained energized through their own respective contacts K18–1, K19–1, K20–1, K21–1 and pulse timing switch 69e.

For purposes of illustration, let it be assumed that during the chip ball sensing operation the relay K9 is energized thereby closing normally-open relay contacts K9–2 to energize relay K19 during the "make" condition of pulse timing switch 68e. Relay K19 is maintained energized through its own contacts K19–1 by pulse timing switch 69e. The other relay contacts K8–2, K10–2, K11–2 and K18–1, K20–1, K21–1 remain open.

Relay K22 is thereby energized to indicate an "accept" condition to the effect that one and only one ball was detected during the chip orientation sensing operation, and is maintained energized through its own contacts K22–1 by pulse timing switch 71e. Relay K22 is energized for this "accept" condition by a pulse timing switch 70e through an EXCLUSIVE-OR circuit comprising normally-closed pairs of relay contacts K18–2 and K19–2 in series with two double-throw relay contact pairs K20–2 and K21–2 between pulse timing switch 70e and relay K22. Extending between switch 70e and relay K22 is another series network comprising double-throw relay contact pairs K18–3 and K19–3 and normally-closed relay contact pairs K20–3 and K21–3.

It will be seen that the pulse transmitted by timing switch 70e will pass through the EXCLUSIVE-OR circuit to energize relay K22 if any one, but not more than one, of these pairs of relay contacts is actuated. More specifically, if none of the relays K18 to K21 is energized so that none of the relay contact pairs of the EXCLUSIVE-OR circuit is actuated, both of the series paths between pulse timing switch 70e and relay K22 will remain open so as to prevent the energization of the latter. Similarly, if more than one of the relays K18 to K21 inclusive is energized as a result of more than one chip ball B being sensed by device 35e to close more than one of the switches 36e to 39e, then more than one pair of contacts of the EXCLUSIVE-OR circuit will be actuated. This again maintains both series paths open between pulse timing switch 70e and relay K22 so as to prevent energization of the latter.

The non-energization of relay K22 is the "reject" condition which causes K22–3 in FIG. 23 to remain closed to permit pulse timing switch 74e to transmit a pulse energizing solenoid 75e. Furthermore, relay contacts K22–2 remain closed to permit pulse timing switch 72e to energize relay K23 to indicate a "reject" condition and which is held through its own contacts K23–1. This closes relay contacts K23–2 permitting pulse 70e to energize reject memory relay K24 held through its own contacts K24–1 by pulse timing switch 71e.

If the lower end of vacuum needle 18 is closed off either by the presence of a chip C thereon, or a result of being clogged by flux or a dirt particle, then the pressure within needle 18 will be lower than atmospheric so as to actuate vacuum detector VD1 in FIG. 101. If the solenoid 75e has been actuated to blow off from needle 18 any chip which may be present thereon, then the actuation of vacuum detector VD1 must indicate that the vacuum is caused by a clogged needle. The energization of reject memory relay K24 closes contacts K24–2 to permit pulse timing switch 72e to transmit a pulse through the actuated vacuum detector VD1 to energize clog needle relay K25 held closed through its own contacts K25–1, thereby stopping the machine to permit removal of the flux or other contaminant from those vacuum needles 18 requiring this service.

In the event that the end of vacuum needle 18 is neither clogged nor closed off by the presence of a chip C thereon, the interior of the needle is then in communication with the atmosphere and vacuum detector VD1 will be actuated to indicate that there is no vacuum present within the needle. This permits pulse timing switch 72e to energize recycle control relay K26 which is maintained closed through its own contacts K26–1 by pulse timing switch 73e. The energization of relay K26 closes relay contacts K26–2 to permit pulse timing switch 70e to energize recycle memory relay K27 which is held closed through its own contacts K27–1 by pulse timing switch 71e. Pulse timing switch 72e then transmits a pulse through closed relay contacts K27 to energize recycle relay K28.

Referring again to FIG. 23 energization of relay K28 is maintained through its own contacts K28–1 and closes contacts K28–2 (FIG. 17) to permit pulse timing switch 24e to transmit a pulse which energizes chip positioning one-revolution clutch control relay K7, thereby closing contacts K7–2 permitting pulse timing switch 29e to energize chip positioning one-revolution clutch solenoid 30e, thereby causing the respective chip placement head 17 to proceed through another cycle of operation.

In the event that the next successive vacuum needle 18 of the chip placement head 17 produces the same "no vacuum" condition to initiate another recycle of the head 17, these successive recycles are counted as the head 17 continues its repeated attempts to pick up a chip C on the end of a vacuum needle 18 with the chip aligned so that only one ball B is detected by the chip ball sensing device 35e. However, after a predetermined number of recycles, the machine is shut down in the following manner. Each energization of recycle control relay K26 in FIG. 23 closes relay contacts K26–3 to permit pulse timing switch 76e to transmit a pulse to a successive recycle counter 77e. The latter is provided with a program selector indicated generally at 79e and comprising a selector arm 179e which may connect the output end of a pulse timing switch 78e to the left-hand terminal of a selected one of the normally-closed switches 279e.

Each of the latter remains closed until the counter 77e registers a certain number of recycle operations for the particular chip placement head 17. For example, the uppermost of the switches 279e opens when counter 77e registers two recycles, the next lowermost switch 279e opens when counter 77e registers four recycles, etc. Selector arm 179e is illustrated as having been adjusted to contact the second of the switches 279e, which switch will open when counter 77e registers four successive recycles. In this event, chip positioner functioning relay K102 (associated with the first chip placement head 17) will not be energized, thereby stopping the machine in a manner to be described below.

In the event that vacuum needle 18 is not clogged, relay K25 is not energized so that normally-closed contacts K25–2 in FIG. 23 remain closed. If, furthermore, chip ball sensing device 35e indicates an "accept" condition to energize relay K22 and thereby open contacts K22–2 to prevent energization of reject relay K23 which in turn maintains relay contacts K23–2 in FIG. 22 open to prevent energization of reject memory relay K24. This maintains contacts K24–2 in FIG. 23 open to prevent energization of recycle control relay K24 through diode D1 and thereby maintains contacts K26–2 FIG. 22 open to prevent energization of recycle memory relay K27. This in turn maintains contacts K27–2 in FIG. 23 open to prevent energization of recycle relay K28 and thereby maintains normally-closed contacts K28–2 closed. Assuming further that the "not-in-manual" switch 80e remains closed, it will thus be seen that pulse timing switch 78e will transmit a pulse through program selector 79e to energize chip placement head No. 1 functioning relay K102. This sends to the system control to be described hereinbelow a signal indicating that the first chip placement head 17 is functioning properly.

The phrase "larger base member" in several of the claims is intended to be generic to include "larger workpiece" as employed above in the specification.

It is to be understood that the embodiment described above is merely illustrative of one of the many forms which the invention may take in practice and that numerous modifications thereof will readily occur to those skilled in the art without departing from the scope of the invention as delineated in the appended claims which are to be construed as broadly as permitted by the prior art.

I claim:

1. In a chip positioning machine having a chip placement means operative in each cycle of operation to move a chip carrying element in proximate relation to a substrate to place a chip thereupon and a conveyor movable to carry substrates in succession to said chip placement means, the improvement comprising
   means for sensing whether the chip carried by said element is acceptable,
   means responsive to said sensing means for removing unacceptable chips from said carrying element,
   means operative after said removing means for detecting whether said element is carrying a chip,
   means to index said conveyor in responsive to an affirmative detection by said detecting means,
   and means to actuate said chip placement means through another cycle while the conveyor remains stationary in responsive to a negative detection by said detecting means.

2. In a small workpiece positioning machine having a small workpiece placement means operative in each cycle of operation to move a small workpiece carrying element in proximate relation to a larger base member to place a workpiece thereupon, the improvement comprising
   means for sensing whether the workpiece carried by said element is acceptable,
   means responsive to said sensing means for removing unacceptable workpieces from said carrying element,
   means operative after said removing means for detecting whether said element is carrying a workpiece,
   and means to actuate said workpiece placement means through another cycle of operation in response to a negative detection by said detecting means.

3. In a small workpiece positioning machine having a small workpiece placement head operative in each cycle of operation to move one of a series of workpieces carrying vacuum needles successively in proximate relation to a respective one of a series of larger base members to place a workpiece upon each of said larger base members, and a conveyor movable to carry said larger base members in succession to said workpiece placement head, the improvement comprising
   means for sensing whether the workpiece carried by a needle is acceptable,
   means responsive to said sensing means for removing an unacceptable workpiece from said needle,
   means operative after said removing means for detecting whether said needle is open to the atmosphere,
   means to index said conveyor in response to a negative detection by said detecting means, and
   means responsive to an affirmative detection by said detecting means to actuate said workpiece placement head through another cycle of operation to move the next succeeding needle in proximate relation to the substrate while the conveyor remains stationary.

4. In a small workpiece positioning machine having a small workpiece placement head operative in each cycle of operation to move one of a series of workpiece carrying vacuum needles successively in proximate relation to a respective one of a series of larger base member to place a workpiece upon each of said larger base members, and a conveyor movable to carry said larger base members in succession to said workpiece placement head, the improvement comprising
   means for sensing whether the workpiece carried by a needle is acceptable,
   means responsive to said sensing means for blowing off a non-acceptable workpiece from said needle,
   vacuum-responsive means operative after said blowing off means for detecting whether said needle is carrying a workpiece,
   means to index said conveyor in response to an affirmative detecting by said detection means,
   and means responsive to a negative detection by said detecting means to actuate said workpiece placement head through another cycle of operation to move the next succeeding needle in proximate relation to the larger base member while the conveyor remains stationary.

5. In a chip positioning machine having a chip placement head operative in each cycle of operation to move one of a series of chip carrying vacuum needles successively in proximate relation to a respective one of a series of substrates to place a chip upon each of said substrates, the improvement comprising
   chip engaging means for sensing whether the chip carried by a needle is acceptable,
   means responsive to said sensing for blowing off a non-acceptable chip from said needle,
   vacuum responsive means operative after said removing means for detecting whether said needle is open to the atmosphere,
   means to index said conveyor in response to a negative detection by said detecting means,
   and means responsive to an affirmative by said detecting means to actuate said chip placement head repeatedly through additional cycles of operation to repeatedly move the next succeeding needle in proximate relation to the substrate while the conveyor remains stationary until said chip engaging means senses an acceptable chip.

6. In a chip positioning machine having a chip placement means operative in each cycle of operation to move a chip carrying vacuum needle in proximate relation to a substrate to place thereupon a chip having electrode contact elements, and a conveyor movable to carry substrates in succession to said chip placement means, the improvement comprising,
   a plurality of mutually spaced sensing means alternately engageable by only one of said contact elements if the chip is acceptable for sensing the angular orientation of said one contact element while the chip is on said needle,
   means for removing a chip from said needle in response to the engagement of either none or more than one of said sensing means by said contact elements of the chip,
   means operative after said removing means for detecting whether said needle is carrying a chip,
   means to index said conveyor in response to an affimative detection by said detecting means and after said chip has been placed upon a substrate,
   means to actuate said chip placement means through another cycle of operation while the conveyor remains stationary in response to a negative detection by said detecting means whereby the chip placement means makes another attempt to place a chip upon the same substrate,
   means to repeatedly activate said chip placement means makes another attempt to place a chip upon the same substrate,
   means to repeatedly activate said chip placement means through additional cycles of operation until either an affirmative detection is made by said detection means or a predetermined number of cycles has occurred,
   and means to stop the machine for servicing when said predetermined number of cycles has occurred.

7. In a chip positioning machine having a chip placement means operative in each cycle of operation to move a chip carrying vacuum needle in proximate relation to a substrate to place thereupon a chip having electrode contact elements, and a conveyor movable to carry substrates in succession to said chip placement means, the improvement comprising,

- a plurality of mutually spaced sensing means alternately engageable by only one of said contact elements if the chip is acceptable for sensing the angular orientation of said one contact element while the chip is on said needle,
- means for blowing off a chip from said needle in response to the engagement of either none or more than one of said sensing means by said contact elements of the chip,
- vacuum-responsive means operative after said removing means for detecting whether said needle is carrying a chip,
- means to index said conveyor in response to an affirmative detection by said detecting means and after said chip has been placed upon a substrate,
- means to actuate said chip placement means through another cycle of operation while the conveyor remains stationary in response to a negative detection by said detecting means whereby the chip placement means makes another attempt to place a chip upon the same substrate,
- means to repeatedly activate said chip placement means through additional cycles of operation until either an affirmative detection is made by said detection means or a predetermined number of cycles has occurred,
- means to stop the machine for servicing when said predetermined number of cycles has occurred,
- and program means for selectably varying said predetermined number of cycles.

8. In a chip positioning machine having a chip placement head operative in each cycle of operation to move one of a series of chip carrying vacuum needles successively in proximate relation to a respective one of a series of substrates to place a chip upon each of said substrates, and a conveyor movable to carry said substrates in succession to said chip placement head, the improvement comprising,

- means for detecting whether said needle is carrying a chip,
- means to index said conveyor in response to an affimative detection by said detecting means,
- and means responsive to a negative detection by said detecting means to actuate said chip placement head through another cycle of operation to move the next succeeding needle in proximate relation to the substrate while the conveyor means remains stationary.

9. In a chip positioning machine having a chip placement means operative in each cycle of operation to move a chip carrying vacuum needle in proximate relation to a substrate to place thereupon a chip having electrode contact elements, and a conveyor movable to carry substrates in succesion to said chip placement means, the improvement comprising,

- means for detecting whether said needle is carrying a chip,
- means to index said conveyor in response to an affirmative detection by said detecting means and after said chip has been placed upon a substrate,
- means to actuate said chip placement means through another cycle of operation while the conveyor means remains stationary in response to a negative detection by said detecting means whereby the chip placement means makes another attempt to place a chip upon the same substrate,
- means to repeatedly activate said chip placement means through additional cycles of operation until either an affirmative detection is made by said detection means or a predetermined number of cycles has occurred,
- and means to stop the machine for servicing when said predetermined number of cycles has occurred.

References Cited
UNITED STATES PATENTS

| 2,494,474 | 1/1950 | Fermanian et al. | 219—85 |
| 3,056,317 | 10/1962 | Huber et al. | 228—6 |
| 3,083,291 | 3/1963 | Soffa et al. | 219—158 |
| 3,165,818 | 1/1965 | Soffa et al. | 29—203 X |

JOHN F. CAMPBELL, *Primary Examiner.*

THOMAS H. EAGER, *Examiner.*

UNITED STATES PATENT OFFICE
CERTIFICATE OF CORRECTION

Patent No. 3,337,941                      August 29, 1967

Joseph G. Drop

It is hereby certified that error appears in the above numbered patent requiring correction and that the said Letters Patent should read as corrected below.

Column 15, lines 22 and 26, for "responsive", each occurrence, read -- response --; line 30, strike out "small"; same column 15, line 44, for "workpieces" read -- workpiece --.

Signed and sealed this 27th day of August 1968.

(SEAL)
Attest:

Edward M. Fletcher, Jr.
Attesting Officer

EDWARD J. BRENNER
Commissioner of Patents